United States Patent [19]

Abrahamson

[11] 4,431,350
[45] Feb. 14, 1984

[54] DISARMING APPARATUS

[76] Inventor: Carl-Hugo Abrahamson, Båtsmanskroken 5, S-126 57 Hägersten, Sweden

[21] Appl. No.: 279,815

[22] Filed: Jul. 2, 1981

[51] Int. Cl.³ .............................................. B23B 47/18
[52] U.S. Cl. ........................................ 408/11; 408/6; 408/10; 408/14
[58] Field of Search ...................... 408/6, 9, 10, 11, 14

[56] References Cited

U.S. PATENT DOCUMENTS

| | | | |
|---|---|---|---|
| 2,910,895 | 11/1959 | Winslow | 408/10 |
| 2,997,900 | 8/1961 | Pugsley | 408/14 X |
| 4,310,269 | 1/1982 | Neu et al. | 408/10 |

FOREIGN PATENT DOCUMENTS 55-31542  3/1980  Japan ........................................ 408/6

Primary Examiner—W. D. Bray
Attorney, Agent, or Firm—Fleit, Jacobson, Cohn & Price

[57] ABSTRACT

An apparatus for penetrating a casing wall, particularly the casing wall of a detonating or firing mechanism, when disarming an undetonated explosive object, such as a live bomb, includes a drill unit driven by an electric motor and carrier means for carrying the drill unit in substantially any selected position relative to said explosive object. A feed means is arranged for moving in a controllable fashion at least a part of the drill unit holding the drill in the axial direction of said drill, and means are provided for detecting a decrease in the drill torque responsive to penetration of the drill through said wall.

16 Claims, 6 Drawing Figures

U.S. Patent  Feb. 14, 1984  Sheet 1 of 3  4,431,350
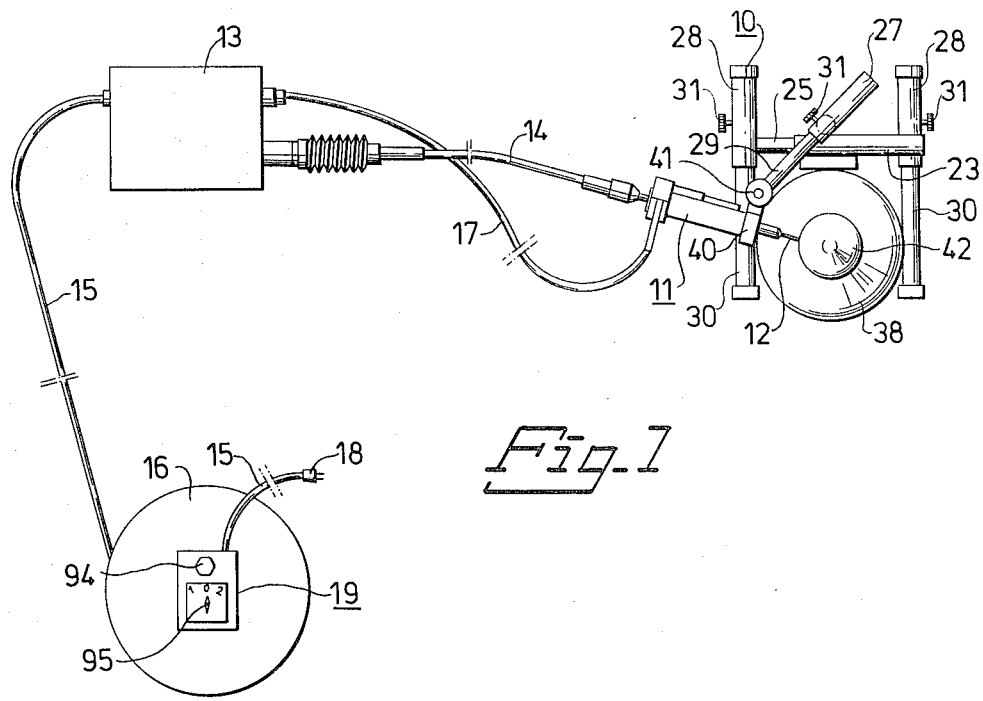
Fig_1
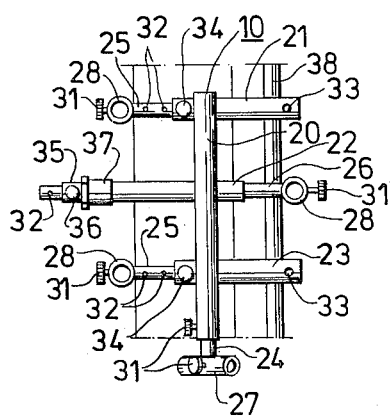
Fig_2
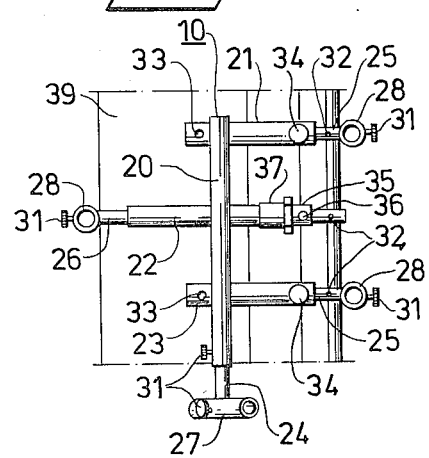
Fig_3

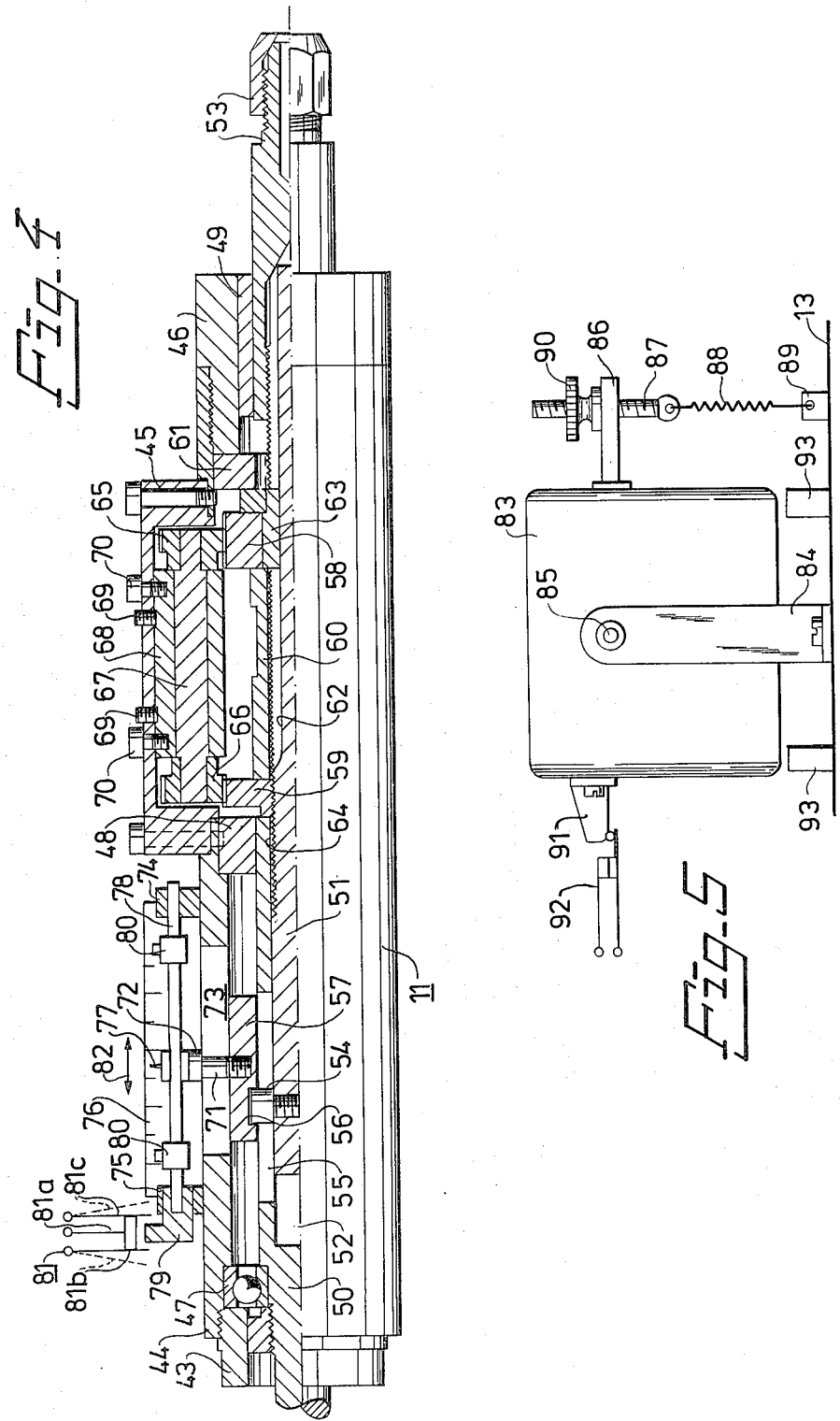

DISARMING APPARATUS

The present invention relates to an apparatus for penetrating a casing wall, particularly the casing wall of a detonating or firing mechanism, when disarming an undetonated explosive object, such as a live bomb, shell, mine, torpedo etc.

When disarming a bomb or like explosive object which has not detonated, it is necessary to enter the interior of the detonating fuse or like firing mechanism, so as to enable the firing mechanism to be made inoperable with the use of appropriate measures. In this respect it has been usual to drill a hole through the wall of the detonating mechanism with the aid of a hand-drill, subsequent to having determined a suitable location and direction for the hole, e.g. by X-raying the detonating mechanism in situ. It will be understood, however, that even though one has thorough knowledge of the construction of the detonating mechanism in question, the task of making said hole is extremely dangerous, particularly when breaking through the wall of the detonating-mechanism casing, since as a result of the force manually applied to the hand-drill, the drill may unintentionally be moved a considerable distance into the detonating mechanism with fatal results. An object of the present invention is to provide an apparatus with which the aforementioned risk are considerably reduced.

To this end it is proposed in accordance with the invention that an apparatus of the kind mentioned in the introduction comprises a drill unit driven by an electric motor; a carrier means for carrying the drill unit in substantially any selected position relative to said explosive object; feed means for moving in a controllable fashion at least a part of the drill unit holding the drill in the axial direction of said drill; and means for detecting a decrease in drill torque responsive to penetration of the drill through said wall. By means of such apparatus it is possible to interrupt the operation of the drill unit and the feed means with good precision, thereby eliminating extreme risks.

In order to minimize the length of time which the disposal squad need remain in the risk zone around the explosive object, the detecting means may, to advantage, include a signal means, suitably in the form of a signal lamp, arranged on a remote-control device adapted to enable the operating current to said motor to be made and broken at a safe distance from the explosive object, and, preferably, also to enable the drive direction of said motor to be reversed.

According to one embodiment of the invention, which is favourable from the aspect of construction, the motor housing of the drill unit is rotatable about the motor axis and is coordinated with a preferably adjustable spring means which strives to rotate the motor housing in a direction coinciding with the direction of rotation of the motor shaft when drilling, with a force so restricted that it is able to prevent the motor housing from rotating in the direction opposite to said direction of rotation only when the drill does not carry-out work with the motor running, said detecting means including means for detecting the position of rotation of the motor housing. In this respect, the motor housing may, to particular advantage, carry means for actuating a switch means in dependence on the position of rotation of the motor housing, said switch means being incorporated in a current circuit for actuating at least one electrically activatable signal means in dependence on said position of rotation.

In order to enable the drill to be localized and aligned positively in relation to the explosive object, even in narrow and confined spaces, irrespective of the orientation of said object, the carrier means may advantageously comprise an adjustable frame structure which can be fixed relative to said object and which is provided with a substantially universely adjustable attachment means for securing the drill unit. For the purpose of saving space, among other things, it is also suitable to arrange the electrical drive motor of the drill unit separate from the remainder of the drill unit and to connect said motor to said unit by means of a flexible drive shaft.

In order to simplify the drive arrangement of the apparatus according to the invention, the feed means may, to advantage, be driven by the motor of the drill unit and connected to the drill-drive mechanism in a manner such as to displace said drill-holding part through a given distance in a direction dependent on the direction of rotation of the motor for each turn of the drill. According to a particularly preferred embodiment of the invention, requiring but small space, the drill unit includes a casing which can be fixed in the carrier means; a first part which is axially immovable but rotatably journalled in said casing and connected to the motor shaft; a drill-holding part which is journalled for axial movement and for rotation in the casing, and which is non-rotatably connected to said first part but axially displaceable in relation thereto, said feed means including a gear means which is operative between said first part and said drill-holding part, and which includes two gears arranged at a constant distance apart and surrounding said drill-holding part, the sides of said gears remote from each other acting on a radial surface on said first part facing the drilling direction and a surface on the drill-unit casing facing in the opposite direction, and of which gears one is axially displaceable but locked against rotation relative to the drill-holding part, while the other is internally screw-threaded and meshes with a screw thread arranged on the outside of the drill-holding part, and in which the two gears engage a respective one of two further gears, each of which is fixedly connected to a shaft extending parallel to the drill shaft and being rotatably journalled in the casing, and in which the ratio between the number of teeth of said one gear and its associated further gear, so differs from the ratio between the number of teeth of said other gear and its associated further gear that said other gear, when the drill rotates in the drilling direction, is screwed along the drill-holding part in a direction towards said first part, to feed the drill-holding part and the drill relative to the casing in dependence upon the number of turns made by the drill, and when the drill rotates in the opposite direction is screwed along the drill-holding part in a direction away from said first part, to withdraw the drill-holding part and the drill relative to said casing, in dependence upon the number of turns made by the drill.

To enable the operational status of the feed means to be observed, for example how the drill-holder part is located relative to the terminal positions of its maximum distance of movement, or how far a drilling operation has reached, means can conveniently be provided for indicating the position of the drill-holding part. Means may also be provided for automatically stopping the motor of the drill unit subsequent to the drill having been advanced and/or withdrawn a predetermined, preferably adjustable distance, for example so as to stop the drill unit automatically at the terminal positions of its maximal movement path or at a location which is located between said terminal positions and at which it is desired to inspect the drill unit and its feed means prior to continuing the drilling operation.

An exemplary embodiment of the invention will now be described in more detail with reference to the accompanying drawings.

FIG. 1 illustrates the construction of an apparatus in accordance with the invention.

FIGS. 2 and 3 are plan views of an adjustable carrying means incorporated in the apparatus shown in FIG. 1. said carrying means being illustrated in a first and a second position of adjustment respectively.

FIG. 4 illustrates, partially in side view and partially in an axial-sectional view, a drill unit forming part of the apparatus illustrated in FIG. 1 and having a feed means incorporated in said unit.

FIG. 5 illustrates schematically an arrangement for indicating drill torque included in the apparatus illustrated in FIG. 1.

Figure 6:
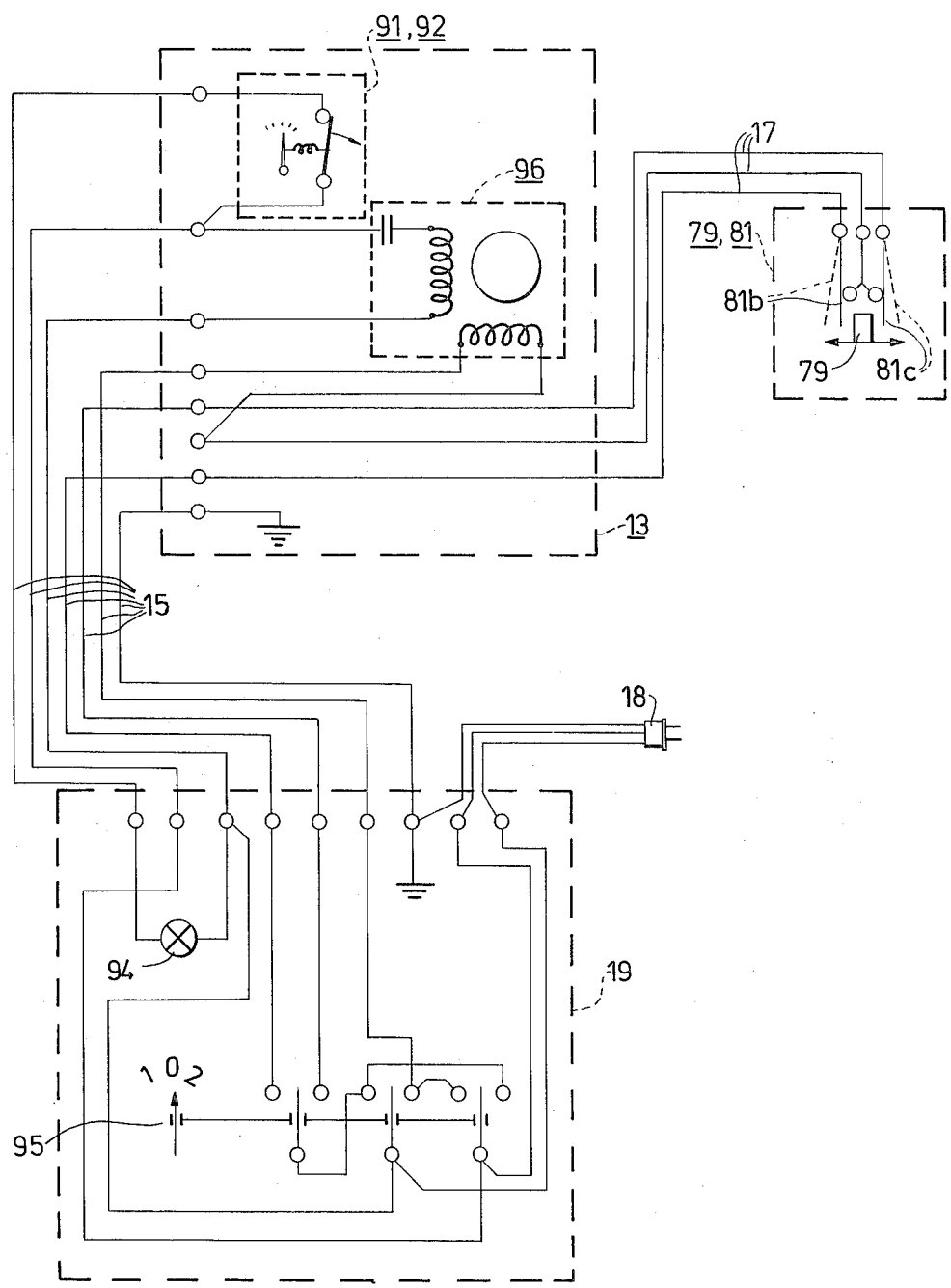
FIG. 6 is a circuit diagram of an electrical drive and control circuit arrangement for the apparatus illustrated in FIG. 1.

In FIG. 1 the reference 10 generally identifies a carrier means or frame structure which carries a drill-unit generally identified at 11, and drill unit including a feed means for advancing or withdrawing a drill 12 through a given distance for each turn of said drill, in dependence on the direction of rotation of the drill 12. The reference 13 identifies a motor box which incorporates an electric motor (not shown in FIG. 1) which via a reduction gear (not shown) and a flexible shaft 14 drives the drill unit 11 with associated feed means. Connected to the electric motor located in the motor box 13 is one end of an electric cable 15, which is suitably several hundred meters long and which can be wound onto a cable drum 16 and through which operating current is supplied to the motor and also control and indicating signals. Control signals are also passed between the electric motor and the unit 11 via a cable 17 extending between said unit and said motor box 13, as will be described in more detail hereinafter. The other end, 18, of the cable 15 is connected to the mains network or to a mobile electrical plant (not shown) via a control means 19, which in the illustrated embodiment is mounted on the cable drum 16.

As illustrated in end view in FIG. 1 and in plan view in FIGS. 2 and 3, the frame structure 10 comprises a longitudinally extending tube 20 and transversely extending tubes 21, 22, 23, the centre tube 22 projecting outwardly substantially to one side of the tube 20, while the other two tubes 21, 23 project outwardly substantially to the other side of the tube 20. The tubes 20–23 are arranged to accommodate therein axially movable tubes 24, 25, 26 which can be locked in desired positions of displacement and which carry at one end thereof transverse sleeves 27, 28 for receiving a tube 29 (FIG. 1) forming part of a holding means for the drill unit 11, and for receiving tubes 30 forming legs for the frame structure. The tubes 30 can be locked in desired axial positions in respective sleeves by means of locking screws 31, while the tubes 24 and 29 can be locked in desired axial positions and positions of rotation in associated tube 20 and sleeve 27 respectively. The tubes 25 and 26 are provided with a plurality of holes 32 distributed along their lengths, while the tubes 21 and 23 are provided at the ends thereof with holes 33. To enable the tubes 25 to be locked against axial and radial movement in associated tubes 21 or 23, a selected hole 32 is placed opposite one of the holes 33 and a locking pin 34 is passed through the thus registered holes 32, 33. Similarly, the tube 26 is provided with holes 32 distributed along the length of said tube. Further, there is provided an externally screw-threaded sleeve 35 which can be moved axially along the tube 26 and which can be locked against axial and radial movement by means of a locking pin 36 which passes through a radial hole in the sleeve 35 and a selected hole 32 in the tube 26. Screwed onto the sleeve 35 is an internally screw-threaded sleeve 37 which is arranged to abut the adjacent end of the tube 22. The frame structure 10 is arranged to be fixed in a desired position relative to an explosive object, such as a bomb or the like, to be disarmed, as shown at 38 in FIGS. 1 and 2 and at 39 in FIG. 3 respectively. To this end the frame structure can be adapted to the size of the object 38 or 39 by inserting the tubes 25, 26 into associated tubes 21, 22 or 23, from one direction or the other, and locking the legs 30 and the tubes 25 and the sleeve 35 in positions in which the tubes 30 are located adjacent said object. For the purpose of firmly fixing the frame structure 10 relative to the explosive object, the sleeve 37 is screwed towards the adjacent end of the tube 22, until the object 38 or 39 is clamped between the frame legs formed by tubes 30 located on opposite sides of said object. The tube 29 carries on the end thereof projecting from sleeve 27 a fitting 40 which embraces and holds the drill unit 11. The fitting 40 is connected to the tube 29 via a pivot means 41 which permits the fitting to rotate, and therewith the drill unit 11, about an axis extending at right angles to the drilling direction, and to be locked in a desired position of rotation. The reference 42 in FIG. 1 identifies a casing for a detonating fuse or the like, through the wall of which casing a hole is to be drilled at a predetermined location and in a predetermined direction. The position of the drill unit 11 is set to enable a hole to be drilled in the aforesaid manner, by adjusting the axial and rotary positions of the tubes 24 and 29, and the rotary position of the pivot means 41.

The drill unit, which is illustrated in more detail in FIG. 4, includes a casing comprising parts 43, 44, 45 and 46, in which casing there is carried, by means of bearings 47, 48 and 49, an input part 50 driven via the flexible shaft 14 (FIG. 1), and a drill-holding part 51 for holding the drill 12 (FIG. 1). The input part 50, which is rotatably mounted by means of bearings 47, 48, is immovable axially and accomodates the inner end part of the drill-holding part 51 in a cylindrical bore 52, said drill-holding part 51 having at its opposite end a chuck structure 53. The drill-holding part 51 is mounted for rotation and for axial movement in the bearing 49 and is also journalled for axial movement in the bore 52 of the part 50. In order to prevent the parts 50, 51 from rotating relative to each other, there is screwed radially into the part 51 a screw having a cylindrical head 54 which is accomodated in a slot 55, having a width conforming thereto, in the part 50. The screw head 54 projects radially somewhat beyond the part 50, and the outermost part of the head 54 is accomodated in a peripherally extending internal groove 56 in a sleeve 57 which is mounted for rotational and axial movement relative to the outer surface of the part 50.

For the purpose of advancing or withdrawing the drill-holding part 51 through a given distance for each turn of the drill, depending upon the direction of rotation of the input part 50, there is provided a gear means which is operative between said parts 50, 51 and which includes two gear wheels 58 and 59 which surround the drill-holding part and which are held at a constant distance apart by means of a spacing sleeve 60. The side of the gear wheel 58 remote from the spacing sleeve 60 abuts the end of the casing part 46 via two spacing means 61, while the other gear wheel 59 abuts the forward end of the input part 50. The gear wheel 58 is coupled to the drill-holding part by means of a groove 62 arranged in the drill-holding part 51 and a key 63 in a manner such that while the gear wheel 58 can move axially it is locked against rotation relative to the part 51. The other gear wheel 59 has an internal screw-thread and is in thread engagement with an external screw thread 64 arranged on the drill-holding part 51. Each of the gear wheels 58, 59 meshes with a further respective gear wheel 65, 66 which are fixedly connected to a shaft 67 which extends substantially parallel to the axis of rotation of the parts 50, 51 and which is rotatably mounted in a journal block 68 which is held in a desired position in the casing part 45 by means of set screws 69 and locking screws 70. The ratio of the number of teeth of the gear wheel 58 to the gear wheel 65 so differs from the ratio of the number of teeth of gear wheel 59 to gear wheel 66 that when rotating the parts 50, 51 in the intended drilling direction, the gear wheel 59 is screwed along the drill-holding part towards the input part 50, so that the part 51 is fed to the right as seen in FIG. 4 relative to the casing 43–46 through a distance dependent upon the number of turns made by the drill, and when rotating the parts 50, 51 in the opposite direction is screwed along the drill-holding part 51 away from the input part 50, so that the part 51 is withdrawn inwardly into the bore 52 of the input part to an extent dependent on the number of turns made by the drill.

Radially screwed into the sleeve 57 is a screw having a stem 71 whose part located nearest the screw head 72 is guided in a conforming axial slot 73 in the casing part 44. As a result of the aforedescribed coupling between the screw head 54 and the sleeve 57, said sleeve, and therewith also the screw 71, 72, will move along the input part 50 in the same manner of axial movement as the drill-holding part 51. Arranged on the frame part 44 are two attachment means 74, 75, between which there extends a part 76 provided with a scale, and an indicator 77 is arranged on the screw-head 72 to enable the position of the drill-holding part 51 relative to the input part 50 to be readily observed. Extending between the attachment means 74, 75 is a rod 78 one end of which is mounted for axial movement in the attachment means 74, and the other end of which is secured in a switch-actuating body 79, via which the rod is also journalled for axial movement in the attachment means 75. The rod 78 extends through a diagonal slot in the screw-head 72 and carries two stops 80, which can be fixed in selected positions along the rod and via which the screw-head 72 can displace the rod 78, and therewith the body 79, axially. The body 79 is arranged to actuate a switch 81 having a stationary contact element 81a, and two movable contact elements 81b and 81c which can be swung outwardly by means of the body 79 when said body moves in the directions illustrated by the double-headed arrow 82 to the positions shown in broken lines, in which positions said movable contact elements are out of contact with the stationary contact element 81a.

FIG. 5 illustrates an electric motor for driving the drill unit 11. The electric motor is shown in rear view and is incorporated in the motor box 13, shown at the bottom of the Figure, and has a motor housing 83. The motor housing is carried by carrier means 84 in a manner such as to permit the housing to rotate about a shaft 85 extending co-axially with the motor shaft. The motor housing 83 carries a lug 86 through which there extends an axially movable screw means 87, one end of which is connected to an attachment means 89 on the motor box 13 via a tension spring 88. On the side of lug 86 opposite the spring 88, there is arranged on the screw 87 a setting nut 90 which meshes with said screw. Projecting from the side of the motor housing 83 opposite the lug 86 is a switch-actuating means 91 which is arranged to break a switch 92 when the motor housing 83 is rotated anticlockwise from the position shown in FIG. 5. Rotation of the motor housing 83 is restricted by means of stop means 93. In the FIG. 5 embodiment it is assumed that the motor shaft is arranged to rotate in a clockwise direction when the drill 12 is driven in its working direction. When, in this case, the motor shaft rotates clockwise, the motor housing 83 will strive to rotate anti-clockwise, due to the reaction forces created. When using the illustrated disarming apparatus, the spring force exerted by the tension spring 88 and acting in a direction opposite to said reaction forces is set with the aid of the nut 90, so that in the position illustrated in FIG. 5 the spring force is able to balance the reaction force only when the drill 12 does carry out work with the drive motor running. However, when the reaction force increases, as occurs when a greater torque is taken from the motor as the drill 12 carries out work, the motor housing 83 is turned anti-clockwise, whereat the switch-actuating means 91 will move the switch 92 to a circuit-breaking state. The switch 92 is incorporated in a current circuit which includes a signalling means 94 in the form of a lamp which is arranged on the control means 19 and which will thus be extinguished when the drill 12 works and illuminated as soon as the tip of the drill 12 has broken through the wall of the detonating fuse casing 42 illustrated in FIG. 1.

The electrical drive and control system is illustrated schematically in FIG. 6. Thus, FIG. 6 illustrates the control means 19, which is supplied, via an electric plug 18, with current from an a.c. source (not shown) and which includes the signal means 94 and a selector switch 95 by means of which drive and control current can be broken (position "0") and closed either for driving the drill 12 in its working direction and advancing the same (position "1"), or for rotating the drill 12 in the opposite direction and withdrawing the drill (position "2"). FIG. 6 also illustrates the motor box 13 with the schematically illustrated motor 96 and the switch means 91, 92 and 79, 81 respectively. As will be seen from the circuit diagram shown in FIG. 6, current will only flow through the signal means 94 when the switch means 91, 92 is closed, whereby with suitable adjustment of the nut 90 a signal will be given as soon as the tip of the drill 12 has broken through the wall of casing 42, whereat feeding of the drill 12 is stopped, and the drill can be withdrawn by setting the selector switch 95 to position "2". It will also be seen from the circuit diagram that the supply of current to the motor 96 ceases when the body 79, with the selector switch 95 in position "1", moves the contact element 81c of the switch 81 to its broken-line position, or if the body 79, with the selector switch 95 in position "2", moves the contact element 81b to its position shown in broken lines.

I claim:

1. Apparatus for penetrating a casing wall, particularly a casing wall of a detonating or firing mechanism when disarming an undetonated explosive object, said apparatus including a drill unit driven by an electric motor having a motor housing and a motor shaft which is connected to said drill unit; carrier means for carrying the drill unit in substantially any selected position relative to said explosive object; feed means for moving in a controllable fashion at least a part of the drill unit holding the drill in the axial direction of said drill; and means for detecting a decrease in the drill torque responsive to penetration of the drill through said wall, wherein said motor housing is rotatable about the motor shaft and is co-ordinated with a spring means biasing the motor housing in a direction coinciding with the direction of rotation of the motor shaft when drilling, with a force so restricted that it is able to prevent the motor housing from rotating in the direction opposite to said direction of rotation only when the drill does not carry out work with the motor running, said detecting means including means for detecting the position of rotation of the motor housing.

2. An apparatus according to claim 1, wherein the motor housing carries means for actuating a switch means in dependence on the position of rotation of the motor housing, said switch means being incorporated in a current circuit for actuating at least one electrically activatable signal means in dependence on said position of rotation.

3. An apparatus according to claim 1, wherein the carrier means comprises an adjustable frame structure which can be fixed relative to said object and which is provided with a substantially universally adjustable attachment means for securing the drill unit.

4. An apparatus according to claim 1, wherein the electrical drive motor of the drill unit is separate from the remainder of the drill unit and is connected thereto via a flexible drive shaft.

5. An apparatus according to claim 1, wherein the feed means is driven by the motor of the drill unit and is connected to the drill-drive mechanism in a manner such as to displace said drill-holding part through a given distance in a direction dependent upon the direction of rotation of the motor for each turn of the drill.

6. An apparatus according to claim 5, wherein the drill unit includes a casing which can be fixed in the carrier means; a first part which is axially immovable but rotatably journalled in said casing and connected to the motor shaft; a drill-holding part which is journalled for axial movement and for rotation in the casing, and which is non-rotatably connected to said first part but axially displaceable in relation thereto, said feed means including a gear means which is operative between said first part and said drill-holding part, and which includes two gears arranged at a constant distance apart and surrounding said drill-holding part, the sides of said gears remote from each other acting on a radial surface on said first part facing the drilling direction and a surface on the drill-unit casing facing in the opposite direction, and of which gears one is axially displaceable but locked against rotation relative to the drill-holding part, while the other is internally screw-threaded and meshes with a screw thread arranged on the outside of the drill-holding part, and in which the two gears engage a respective one of two further gears each of which is fixedly connected to a shaft extending parallel to the drill shaft and being rotatably journalled in the casing, and in which the ratio between the number of teeth of said one gear and its associated further gear so differs from the ratio between the number of teeth of said other gear and its associated further gear that said other gear, when the drill rotates in the drilling direction, is screwed along the drill-holding part in a direction towards said first part, to feed the drill-holding part and the drill relative to the casing in dependence upon the number of turns made by the drill, and when the drill rotates in the opposite direction is screwed along the drill-holding part in a direction away from said first part, to withdraw the drill-holding part and the drill relative to said casing, in dependence upon the number of turns made by the drill.

7. An apparatus according to claim 5 including means for indicating the position of the drill-holding part.

8. An apparatus according to claim 5, including means for automatically stopping the motor of the drill unit subsequent to the drill having been advanced through a predetermined, adjustable distance.

9. An apparatus according to claim 2, wherein said signal means is arranged on a remote-control device including means for controlling energization and drive direction of said motor.

10. Apparatus for penetrating a casing wall, particularly a casing wall of a detonating or firing mechanism when disarming an undetonated explosive object, said apparatus including a drill unit driven by an electric motor having a motor housing and a motor shaft which is connected to said drill unit; carrier means for carrying the drill unit in substantially any selected position relative to said explosive object; feed means for moving in a controllable fashion a part of the drill unit holding the drill in the axial direction of said drill; and means for detecting a decrease in the drill torque responsive to penetration of the drill through said wall, wherein the electrical drive motor of the drill unit is separate from the remainder of the drill unit and is connected thereto via a flexible drive shaft, and wherein the feed means is driven by the motor of the drill unit and is connected to said dirve shaft in a manner such as to displace said drill-holding part through a given distance in a direction dependent upon the direction of rotation of the motor for each turn of the drill.

11. An apparatus according to claim 10, wherein the drill unit includes a casing which can be fixed in the carrier means; a first part which is axially immovable but rotatably journalled in said casing and connected to the motor shaft; a drill-holding part which is journalled for axial movement and for rotation in the casing, and which is non-rotatably connected to said first part but axially displaceable in relation thereto, said feed means including a gear means which is operative between said first part and said drill-holding part, and which includes two gears arranged at a constant distance apart and surrounding said drill-holding part, the sides of said gears remote from each other acting on a radial surface on said first part facing the drilling direction and a surface on the drill-unit casing facing in the opposite direction, and of which gears one is axially displaceable but locked against rotation relative to the drill-holding part, while the other is internally screw-threaded and meshes with a screw thread arranged on the outside of the drill-holding part, and in which the two gears engage a respective one of two further gears each of which is fixedly connected to a shaft extending parallel to the drill shaft and being rotatably journalled in the casing, and in which the ratio between the number of teeth of said one gear and its associated further gear so differs from the ratio between the number of teeth of said other gear and its associated further gear that said other gear, when the drill rotates in the drilling direction, is screwed along the drill-holding part in a direction towards said first part, to feed the drill-holding part and the drill relative to the casing in dependence upon the number of turns made by the drill, and when the drill rotates in the opposite direction is screwed along the drill-holding part in a direction away from said first part, to withdraw the drill-holding part and the drill relative to said casing, in dependence upon the number of turns made by the drill.

12. An apparatus according to claim 10, comprising means for indicating the position of the drill-holding part.

13. An apparatus according to claim 10, comprising means for automatically stopping the motor of the drill unit subsequent to the drill having then advanced through a predetermined, adjustable distance.

14. An apparatus according to claim 10, wherein the motor housing is rotatable about the motor shaft and is co-ordinated with a spring means biasing the motor housing in a direction coinciding with the direction of rotation of the motor shaft when drilling, with a force so restricted that it is able to prevent the motor housing from rotating in the direction opposite to said direction of rotation only when the drill does not carry out work with the motor running, said detecting means including means for detecting the position of rotation of the motor housing, and wherein the motor housing carries means for actuating a switch means in dependence on the position of rotation of the motor housing, said switch means being incorporated in a current circuit for actuating at least one electrically activatable signal means in dependence on said position of rotation.

15. An apparatus according to claim 14, wherein said signal means is arranged on a remote-control device including means for controlling energization and drive direction of said motor.

16. An apparatus according to claim 10, wherein the carrier means comprises an adjustable frame structure which can be fixed relative to said object and which is provided with a substantially universally adjustable attachment means for securing the drill unit.

* * * * *